(12) United States Patent
Banatwala et al.

(10) Patent No.: US 9,998,553 B2
(45) Date of Patent: *Jun. 12, 2018

(54) CHECKING DOCUMENTS FOR SPELLING AND/OR GRAMMATICAL ERRORS AND/OR PROVIDING RECOMMENDED WORDS OR PHRASES BASED ON PATTERNS OF COLLOQUIALISMS USED AMONG USERS IN A SOCIAL NETWORK

(71) Applicant: International Business Machines Corporation, Armonk, NY (US)

(72) Inventors: Mustansir Banatwala, Hudson, NH (US); David A. Brooks, Arlington, MA (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 14/306,740

(22) Filed: Jun. 17, 2014

(65) Prior Publication Data

US 2015/0074172 A1    Mar. 12, 2015

Related U.S. Application Data

(63) Continuation of application No. 14/024,817, filed on Sep. 12, 2013, now Pat. No. 9,838,486.

(51) Int. Cl.
*G06F 17/30* (2006.01)
*H04L 29/08* (2006.01)
*G06F 17/27* (2006.01)

(52) U.S. Cl.
CPC ............ *H04L 67/22* (2013.01); *G06F 17/273* (2013.01); *G06F 17/274* (2013.01); *H04L 67/10* (2013.01); *H04L 67/306* (2013.01)

(58) Field of Classification Search
CPC ............................... G06F 17/273; H04L 67/22
See application file for complete search history.

(56) References Cited

U.S. PATENT DOCUMENTS 9,027,105 B1    5/2015    Saylor
2010/0082751 A1    4/2010    Meijer et al.
(Continued)

OTHER PUBLICATIONS

Office Action for U.S. Appl. No. 14/024,817 dated May 7, 2015, pp. 1-23.
(Continued)

*Primary Examiner* — Mohammad S Rostami
(74) *Attorney, Agent, or Firm* — Robert A. Voiqt, Jr.; Winstead, P.C.

(57) ABSTRACT

A method, system and computer program product for checking documents using colloquialisms. Colloquialisms used in messages by users in a social network are tracked. The relationships (e.g., co-worker) between the senders and recipients of these messages are identified. A social graph is then generated to depict the relations between the users in the social network based on these identified relationships. Furthermore, usage patterns of colloquialisms (e.g., a particular colloquialism is used only with close friends as opposed to co-workers) are formulated. A rule set is generated using the social graph and formulated usage patterns. By using the rule set to check documents, documents may be more accurately checked for spelling and/or grammatical errors by taking into consideration the appropriate usage of colloquialisms based on the context (e.g., communicating with a friend). Furthermore, alternative words or phrases may be appropriately recommended based on the context using such a rule set.

7 Claims, 3 Drawing Sheets

(56) References Cited

U.S. PATENT DOCUMENTS

| | | |
|---|---|---|
| 2011/0010384 A1* | 1/2011 | Luo ................... G06Q 10/10 707/769 |
| 2011/0119258 A1 | 5/2011 | Forutanpour et al. |
| 2011/0178793 A1 | 7/2011 | Giffin et al. |
| 2011/0258204 A1 | 10/2011 | Hubbard et al. |
| 2012/0179449 A1 | 7/2012 | Raskino et al. |
| 2012/0203640 A1* | 8/2012 | Karmarkar ........... G06F 1/1686 705/14.66 |
| 2012/0245925 A1 | 9/2012 | Guha et al. |
| 2012/0259619 A1 | 10/2012 | Hall |
| 2012/0290407 A1 | 11/2012 | Hubbard et al. |
| 2014/0040282 A1* | 2/2014 | Mann ............... G06Q 10/06314 707/748 |
| 2014/0046661 A1* | 2/2014 | Bruner ............... H04N 21/4884 704/235 |
| 2014/0337989 A1 | 11/2014 | Orsini et al. |
| 2015/0046496 A1* | 2/2015 | Karmarkar ............... G09B 7/00 707/798 |
| 2015/0074172 A1 | 3/2015 | Banatwala et al. |

OTHER PUBLICATIONS

Office Action for U.S. Appl. No. 14/024,817 dated Oct. 22, 2015, pp. 1-32.

Tagliamonte et al., "Linguistic Ruin? LOL! Instant Messaging and Teen Language," American Speech, vol. 83, No. 1, University of Toronto, Spring 2008.

Taranto et al., "Academic Social Networking Brings Web 2.0 Technologies to the Middle Grades," Middle School Journal, May 2011.

Lin et al., "Labeling Categories and Relationships in an Evolving Social Network," Advances in Information Retrieval, 30th European Conference on IR Research, ECIR 2008, Lecture Notes in Computer Science, vol. 4956, pp. 77-88, 2008.

Office Action for U.S. Appl. No. 15/667,460 dated Sep. 25, 2017, pp. 1-31.

\* cited by examiner

CHECKING DOCUMENTS FOR SPELLING AND/OR GRAMMATICAL ERRORS AND/OR PROVIDING RECOMMENDED WORDS OR PHRASES BASED ON PATTERNS OF COLLOQUIALISMS USED AMONG USERS IN A SOCIAL NETWORK

TECHNICAL FIELD

The present invention relates generally to communications, and more particularly to checking documents for spelling and/or grammatical errors and/or providing recommended words or phrases based on patterns of colloquialisms used among users in a social network.

BACKGROUND

Messages are sent between users of a computing device, such as via electronic mail ("e-mail"), instant messaging, social media (e.g., social networking sites), text messaging, etc. In the context of these messages between the sender and the recipient, the sender may include a colloquialism in the message. A colloquialism is a word, phrase or paralanguage that is employed in conversational or informal language. Colloquialisms are used in "everyday" conversation, and, increasingly, through informal online interactions. Examples of colloquialisms include words, such as "gonna," "wanna," and "ya'll," as well as phrases, such as "old as the hills," "raining cats and dogs," "dead as a doornail," and "what's up." Such use of colloquialisms is appropriate in specific contexts.

Often, an application program, such as a spell checker and/or grammar checker, will be used to spell check and/or grammar check the message (e.g., e-mail, instant message) prior to the sender transmitting the message to the recipient. However, such application programs may not be tuned to the use of colloquialisms, let alone the appropriate usage of the colloquialisms based on the context. As a result, such application programs may not correctly spell and/or grammar check the message. Furthermore, programs, such as a thesaurus, that offer alternative words or phrases similar to the meaning of a designated word or phrase do not take into consideration colloquialisms. Hence, these programs are limited in their recommended alternative words or phrases to be used.

BRIEF SUMMARY

In one embodiment of the present invention, a method for checking documents using colloquialisms comprises tracking colloquialisms used in messages by users in a social network. The method further comprises identifying relationships between senders and recipients of the messages using the colloquialisms. The method additionally comprises generating a social graph to depict relations between the users in the social network based on the identified relationships. Furthermore, the method comprises formulating usage patterns of the colloquialisms among the users of the social graph. Additionally, the method comprises generating a rule set based on the social graph and the usage patterns of the colloquialisms among the users of the social graph. In addition, the method comprises reviewing, by a processor, a document using the generated rule set.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for checking documents using colloquialisms. In one embodiment of the present invention, colloquialisms used in messages by users in a social network (e.g., online community) are tracked. The relationships (e.g., friend, co-worker, relative) between the senders and recipients of these messages are identified. A social graph may then be generated to depict the relations between the users in the social network based on these identified relationships. Furthermore, usage patterns of colloquialisms among the users of the social graph are formulated, where the usage patterns of colloquialisms may be based on a variety of factors, such as the frequency of collaboration between the senders and recipients of the messages using the colloquialisms, the degree of separation (e.g., socially directly connected with a user versus socially connected with a user by a $2^{nd}$ degree, such as a friend of a friend) between the senders and recipients of the message using the colloquialisms, the number of occurrences of the sender sending the same colloquialisms to other users in the social network, the type of online community (e.g., community for teachers, community for fans of the Detroit Tigers baseball team) the messages using the colloquialisms are posted, etc. A rule set for checking documents for spelling and/or grammatical errors and/or for providing recommended alternative words or phrases is generated based on the social graph and the formulated usage patterns of colloquialisms. A document is then reviewed using the generated rule set for spelling and/or grammatical errors as well as for making contextual relevant recommendations using the generated rule set. By using the generated rule set to check documents, documents may be more accurately checked for spelling and/or grammatical errors by taking into consideration the appropriate usage of colloquialisms based on the context (e.g., the use of "gonna" may be appropriate for communicating with a best friend but may not be appropriate in communicating with a work colleague). Furthermore, alternative words or phrases may be appropriately recommended based on the context (e.g., the parties in the e-mail thread) using such a rule set.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
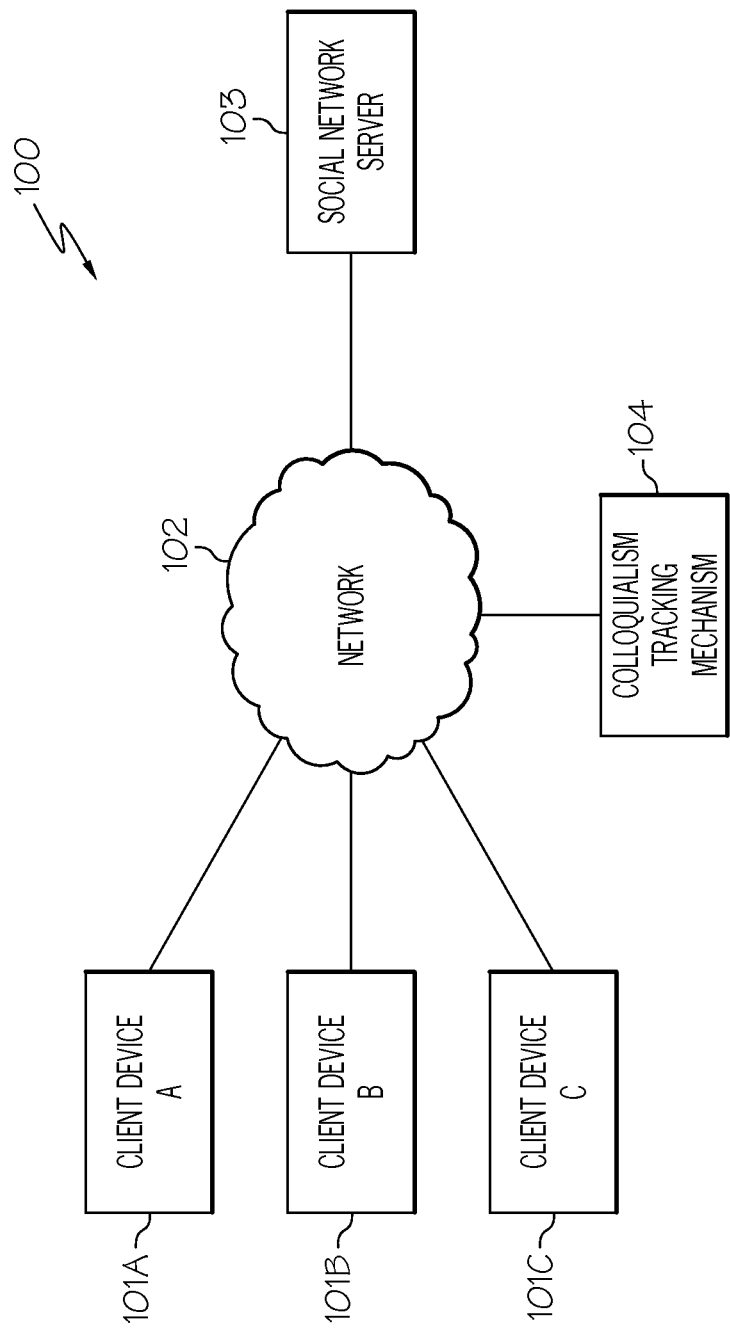
FIG. 1 illustrates a social network system configured in accordance with an embodiment of the present invention.

Referring now to the Figures in detail, FIG. 1 illustrates a social network system 100 configured in accordance with an embodiment of the present invention. Social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which be a web server configured to offer a social networking and/or microblogging service, enabling users of client devices 101 to send and read other users' messages (e.g., e-mail message, instant message). "Messages," as used herein, include a status update, microblog or text-based message that includes any one or more of the following: text (e.g., comments, sub-comments and replies), audio, video images, etc. A user of client device 101 that sends a message is said to be a "sender." A user of client device 101 that receives a message issued by a sender is said to be a "recipient." Social network server 103 is connected to network 102 by wire or wirelessly. While FIG. 1 illustrates a single social network server 103, it is noted for clarity that multiple servers may be used to implement the social networking and/or microblogging service.

System 100 further includes a colloquialism tracking mechanism 104 connected to network 102 by wire or wirelessly. Colloquialism tracking mechanism 104 is configured to track colloquialisms used in messages by users in a social network and to check documents, such as checking documents for spelling and/or grammatical errors and/or for offering alternative words or phrases, using these tracked colloquialisms as discussed in further detail below. A description of the hardware configuration of colloquialism tracking mechanism 104 is provided below in connection with FIG. 2.

System 100 is not to be limited in scope to any one particular network architecture. System 100 may include any number of client devices 101, networks 102, social network servers 103 and colloquialism tracking mechanism mechanisms 104. Furthermore, in one embodiment, colloquialism tracking mechanism 104 may be part of social network server 103. In another embodiment, colloquialism tracking mechanism 104 may be part of client device 101. In another embodiment, the aspect of generating a rule set based on the generated social graph and the usage patterns of the colloquialism among the users of the social graph, as discussed further below, may be performed by a program of colloquialism tracking mechanism 104; whereas, the aspect of checking documents (e.g., checking documents for spelling and/or grammatical errors and/or for offering alternative words or phrases) may be performed by a program of client device 101 using the generated rule set of colloquialism tracking mechanism 104.

Figure 2:
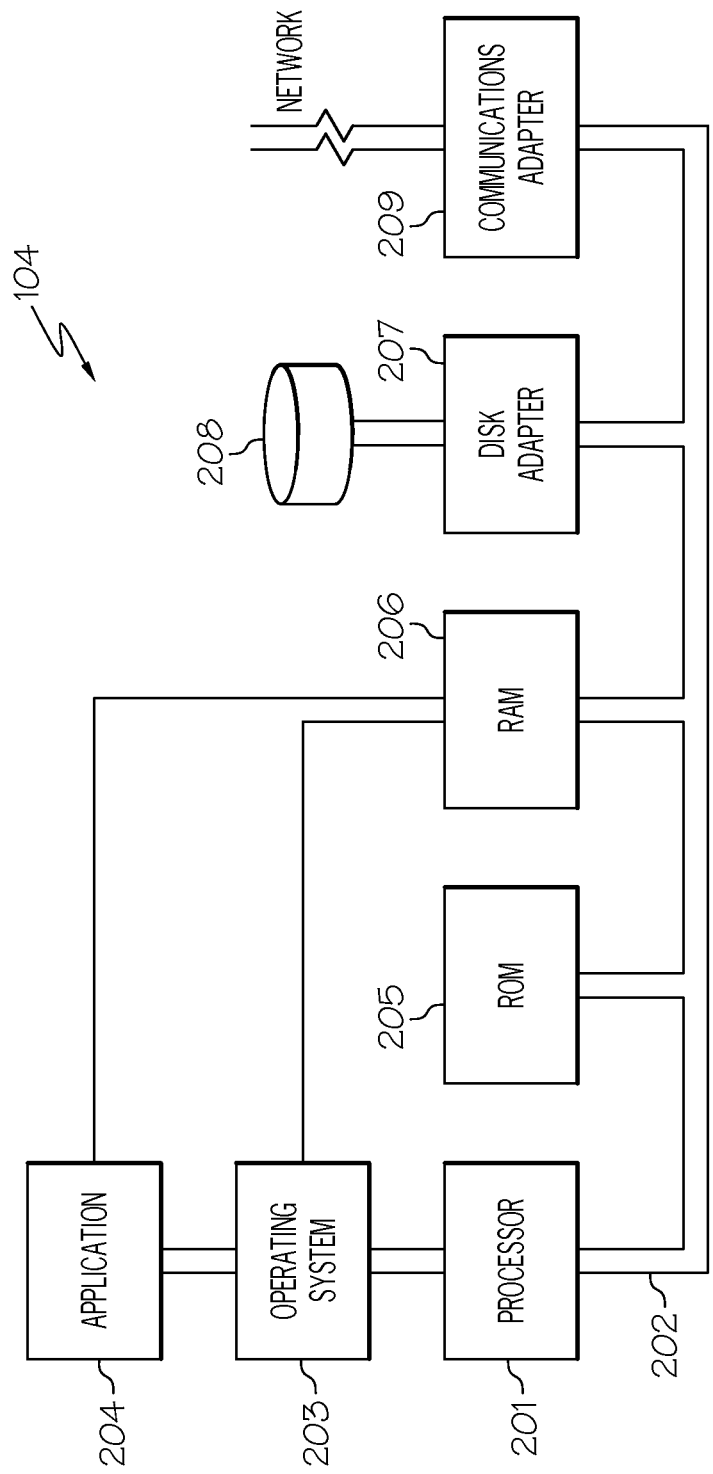
FIG. 2 illustrates a hardware configuration of a colloquialism tracking mechanism configured in accordance with an embodiment of the present invention.

Referring now to FIG. 2, FIG. 2 illustrates a hardware configuration of a colloquialism tracking mechanism 104 (FIG. 1) which is representative of a hardware environment for practicing the present invention. Referring to FIG. 2, colloquialism tracking mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for checking documents using colloquialisms as discussed further below in association with FIG. 3.

Referring again to FIG. 2, read-only memory ("ROM") 205 is coupled to system bus 202 and includes a basic input/output system ("BIOS") that controls certain basic functions of colloquialism tracking mechanism 104. Random access memory ("RAM") 206 and disk adapter 207 are also coupled to system bus 202. It should be noted that software components including operating system 203 and application 204 may be loaded into RAM 206, which may be colloquialism tracking mechanism's 104 main memory for execution. Disk adapter 207 may be an integrated drive electronics ("IDE") adapter that communicates with a disk unit 208, e.g., disk drive. It is noted that the program for checking documents using colloquialisms, as discussed further below in association with FIG. 3, may reside in disk unit 208 or in application 204.

Colloquialism tracking mechanism 104 may further include a communications adapter 209 coupled to bus 202. Communications adapter 209 interconnects bus 202 with an outside network (e.g., network 102 of FIG. 1) thereby allowing colloquialism tracking mechanism 104 to communicate with client devices 101 and social network server 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, messages are sent between users of a computing device, such as via electronic mail ("e-mail"), instant messaging, social media (e.g., social networking sites), text messaging, etc. In the context of these messages between the sender and the recipient, the sender may include a colloquialism in the message. A colloquialism is a word, phrase or paralanguage that is employed in conversational or informal language. Colloquialisms are used in "everyday" conversation, and, increasingly, through informal online interactions. Examples of colloquialisms include words, such as "gonna," "wanna," and "ya'll," as well as phrases, such as "old as the hills," "raining cats and dogs," "dead as a doornail," and "what's up." Such use of colloquialisms is appropriate in specific contexts. Often, an application program, such as a spell checker and/or grammar checker, will be used to spell check and/or grammar check the message (e.g., e-mail, instant message) prior to the sender transmitting the message to the recipient. However, such application programs may not be tuned to the use of colloquialisms, let alone the appropriate usage of the colloquialisms based on the context. As a result, such application programs may not correctly spell and/or grammar check the message. Furthermore, programs, such as a thesaurus, that offer alternative words or phrases similar to the meaning of a designated word or phrase do not take into consideration colloquialisms. Hence, these programs are limited in their recommended alternative words or phrases to be used.

The principles of the present invention provide a means for checking documents, such as checking documents for spelling and grammatical errors, as well as for offering alternative words or phrases, by taking into consideration colloquialisms as discussed further below in association with FIG. 3.

Figure 3:
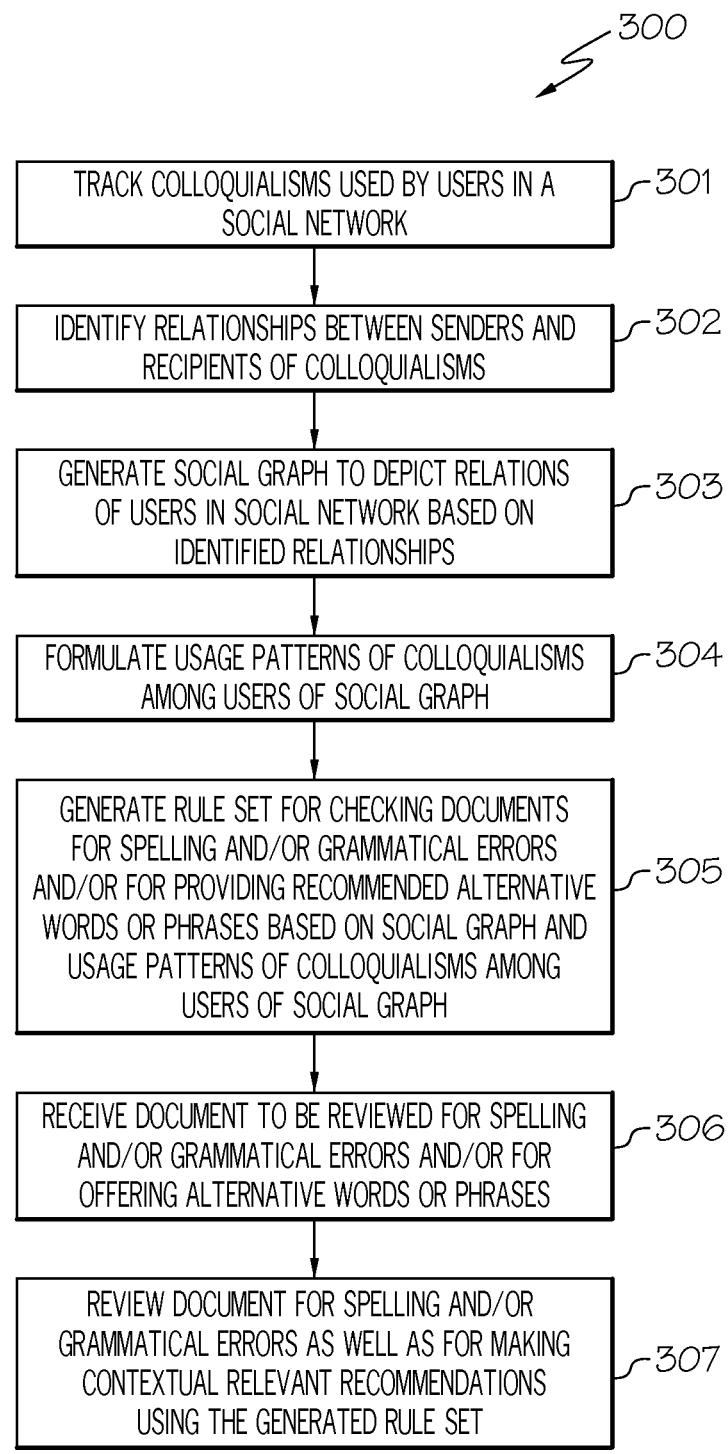
FIG. 3 is a flowchart of a method for checking documents using colloquialisms in accordance with an embodiment of the present invention.

FIG. 3 is a flowchart of a method 300 for checking documents using colloquialisms in accordance with an embodiment of the present invention.

Referring to FIG. 3, in conjunction with FIGS. 1-2, in step 301, colloquialism tracking mechanism 104 tracks colloquialisms used by users of client devices 101 in a social network (e.g., online community). For example, a user of client device 101A may send a message (e.g., text message, e-mail message) to a user of client device 101B using a colloquialism (e.g., "raining cats and dogs") in the message.

In step 302, colloquialism tracking mechanism 104 identifies the relationships between the senders and recipients of the colloquialisms. For example, the user of client device 101A may send a message to his/her sibling, who is the user of client device 101B. Colloquialism tracking mechanism 104 would then identify the relationship between the users of client devices 101A, 101B as being siblings. Other types of relationships that may be identified, include, but not limited to, friend, fan, colleague, relative (e.g., parent, spouse, child), etc.

In step 303, colloquialism tracking mechanism 104 generates a social graph to depict relations between the users (e.g., users of client devices 101) in the social network based on the relationships identified in step 302.

In step 304, colloquialism tracking mechanism 104 formulates usage patterns of colloquialisms among the users (e.g., users of client devices 101) of the social graph. The usage patterns of colloquialisms may be based on a variety of factors, such as the frequency of collaboration between the senders and recipients of the messages using the colloquialisms, the degree of separation (e.g., socially directly connected with a user versus socially connected with a user by a $2^{nd}$ degree, such as a friend of a friend) between the senders and recipients of the message using the colloquialisms, the number of occurrences of the sender sending the same colloquialisms to other users in the social network, the type of online community (e.g., community for teachers, community for fans of the Detroit Tigers baseball team) the messages using the colloquialisms are posted, etc.

In step 305, colloquialism tracking mechanism 104 generates a rule set for checking documents for spelling and/or grammatical errors and/or for providing recommended alternative words or phrases (such as a thesaurus) based on the generated social graph of step 303 and the formulated usage patterns of colloquialisms of step 304. Such a rule set is dynamic in that the rule set will reflect the changes to the usage and appropriateness of colloquialisms. For example, a particular user of client device 101 may share a particular colloquialism among a different group of users over time. In another example, a colloquialism (e.g., "raining cats and dogs") may become more acceptable thereby becoming increasing used in formal interactions as opposed to being limited to informal interactions.

In step 306, colloquialism tracking mechanism 104 receives a document to be reviewed for spelling and/or grammatical errors and/or for offering alternative words or phrases.

In step 307, colloquialism tracking mechanism 104 reviews the document for spelling and/or grammatical errors as well as for making contextual relevant recommendations using the generated rule set. By using the rule set generated in step 305, documents may be more accurately checked for spelling and/or grammatical errors by taking into consideration the appropriate usage of colloquialisms based on the context (e.g., the use of "gonna" may be appropriate for communicating with a best friend but may not be appropriate in communicating with a work colleague). Furthermore, alternative words or phrases may be appropriately recommended based on the context (e.g., the parties in the e-mail thread) using such a rule set.

While the steps of method 300 are described as being performed solely by colloquialism tracking mechanism 104, it is noted that some of the steps may be performed by a program of client device 101, such as the aspect of checking documents (e.g., checking documents for spelling and/or grammatical errors and/or for offering alternative words or phrases) using the generated rule set of colloquialism tracking mechanism 104.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for checking documents using colloquialisms, the method comprising:
    tracking colloquialisms used in messages by users in a social network;
    identifying relationships between senders and recipients of said messages using said colloquialisms;
    generating a social graph to depict relations between said users in said social network based on said identified relationships;
    formulating usage patterns of said colloquialisms among said users of said social graph;
    generating a rule set based on said social graph and said usage patterns of said colloquialisms among said users of said social graph; and
    reviewing, by a processor, a document using said generated rule set.

2. The method as recited in claim 1 further comprising:
    receiving said document to be reviewed for spelling and/or grammatical errors and/or for offering alternative words or phrases.

3. The method as recited in claim 1 further comprising:
    reviewing said document for spelling and/or grammatical errors and/or for making contextual relevant recommendations using said generated rule set.

4. The method as recited in claim 1, wherein said usage patterns of said colloquialisms are based on a frequency of collaboration between said senders and recipients of said messages using said colloquialisms.

5. The method as recited in claim 1, wherein said usage patterns of said colloquialisms are based on a degree of separation between said senders and recipients of said messages using said colloquialisms.

6. The method as recited in claim 1, wherein said usage patterns of said colloquialisms are based on occurrences of said colloquialisms among other users in said social network.

7. The method as recited in claim 1, wherein said usage patterns of said colloquialisms are based on a type of online community said messages using said colloquialisms are posted.

* * * * *